United States Patent
Shimura (10) Patent No.: US 6,883,567 B2
(45) Date of Patent: Apr. 26, 2005

(54) PNEUMATIC TIRE HAVING WEAR INDICATOR

(75) Inventor: Kazuhiro Shimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 102 days.

(21) Appl. No.: 09/923,949

(22) Filed: Aug. 8, 2001

(65) Prior Publication Data

US 2002/0036039 A1 Mar. 28, 2002

(30) Foreign Application Priority Data

Aug. 10, 2000 (JP) ........................................ 2000-242683

(51) Int. Cl.$^7$ .......................... B60C 11/12; B60C 11/24
(52) U.S. Cl. ............................... 152/154.2; 152/209.5; 152/209.17; 152/DIG. 3
(58) Field of Search .......................... 152/154.2, 209.5, 152/209.17, 209.18, 209.22, DIG. 3

(56) References Cited

U.S. PATENT DOCUMENTS

| | | | | |
|---|---|---|---|---|
| 2,102,784 A | * | 12/1937 | Bridges | |
| 2,261,025 A | * | 10/1941 | Havens | |
| 2,706,509 A | * | 4/1955 | White | |
| 3,578,055 A | * | 5/1971 | French | |
| 3,833,040 A | * | 9/1974 | Bins | |
| 4,226,274 A | * | 10/1980 | Awaya et al. | |
| RE30,518 E | * | 2/1981 | French | |
| 5,365,668 A | * | 11/1994 | Canovas et al. | .......... 33/203.11 |
| 5,980,668 A | * | 11/1999 | Slingluff | ................. 156/110.1 |
| 6,023,967 A | * | 2/2000 | Chung et al. | ................. 73/146 |
| 6,523,586 B1 | * | 2/2003 | Eromaki et al. | |

FOREIGN PATENT DOCUMENTS

| | | | |
|---|---|---|---|
| DE | 3627833 | * | 2/1988 |
| EP | 250113 | * | 12/1987 |
| FR | 1498340 | * | 9/1967 |
| GB | 546975 | * | 8/1942 |
| JP | 55-110608 | * | 8/1980 |
| JP | 64-23106 | * | 1/1989 |
| JP | 5-77613 | * | 3/1993 |
| JP | 2001-56215 | * | 2/2001 |

* cited by examiner

Primary Examiner—Steven D. Maki
(74) Attorney, Agent, or Firm—Rader, Fishman & Grauer PLLC (57) ABSTRACT

The invention provides a measuring method of a tread wear amount by using a pneumatic tire in which a mark portion is formed on a part of a tread surface, the mark portion changing its surface shape as wear progresses. Image data of the mark portion is detected, the detected data is inputted in processor means, and then the tread wear amount is determined by use of either ratio referential data of the mark portion inputted in advance and corresponding to the wear amounts of the tread surface, or a formula inputted in advance for computing the wear amount, thereby facilitating automatic measurement of the tread wear amount.

4 Claims, 7 Drawing Sheets

PNEUMATIC TIRE HAVING WEAR INDICATOR

BACKGROUND OF THE INVENTION

The present invention relates to a pneumatic tire and a measuring method of a tread wear amount thereof, more specifically, to a pneumatic tire rendered capable of readily measuring a tread wear amount thereof, and a measuring method of the tread wear amount.

Heretofore, measurement of a tread wear amount of a pneumatic tire has been performed by an operator by means of directly measuring a depth of a groove on a tread surface using a measuring instrument such as a caliper. Accordingly, there has been a problem that measured values of the tread wear amounts may vary due to individual differences of operators.

As a remedy for the above-described problem, a technique of measuring the tread wear amount by use of a laser displacement gauge has been proposed. By continuously detecting distances to a tread surface including main grooves while moving the laser displacement gauge over the tread surface in a width direction of the tire, residual depths of the main grooves are computed, whereby the tread wear amount is automatically measured.

However, an apparatus for measuring the tread wear amount as described above requires an aligning mechanism in order to move the laser displacement gauge with precision. This has incurred a problem such as a complex structure, a high price and onerous maintenance. For this reason, it has been difficult to introduce such apparatus, and further improvements have been expected.

SUMMARY OF THE INVENTION

An object of the present invention is to provide a pneumatic tire in which a tread wear amount is capable of being readily measured.

Another object of the present invention is to provide a measuring method of a tread wear amount of a pneumatic tire, the method which is performed at low cost and with easy maintenance, and is capable of readily measuring the tread wear amount.

The pneumatic tire according to the present invention for achieving the former object is characterized in that a mark portion is formed on a part of a tread surface of the tire, which changes its shape as wear progresses.

With this tire, the tread wear amount is easily discernible by only checking a change of the surface shape of the mark portion.

The measuring method of a tread wear amount of a pneumatic tire according to the present invention for achieving the latter object is characterized by comprising the steps of: detecting image data of the above-mentioned mark portion; inputting the image data to processor means; and determining the wear amount by comparing the image data with ratio referential data of the mark portion by the processor means, the ratio referential data being inputted in advance and corresponding to the wear amounts of the tread surface.

Moreover, another measuring method of a tread wear amount of a pneumatic tire according to the present invention is characterized by comprising the steps of: using a pneumatic tire in which a mark portion is formed on a part of a tread surface, the mark portion changing its surface shape as wear progresses; detecting image data of the mark portion of the pneumatic tire by optical detecting means; inputting the image data to processor means; and determining the wear amount by the processor means by use of the image data and a formula inputted in advance for computing the wear amount, the formula expressing a relation between the wear amount of the tread surface and a change of the surface shape of the mark portion.

As described above, in the present invention, the pneumatic tire is constituted to be provided with the mark portion as described above on the tread surface thereof, the mark portion is inputted to the processor means as the image data, and the tread wear amount is determined. Accordingly, a complex aligning and moving mechanism as required in the case of using a conventional laser displacement gauge becomes unnecessary. Therefore, the measuring method of a tread wear amount of the present invention achieves a low price, easy maintenance, and easy automatic measurement of the tread wear amount with precision in a short period of time.

BRIEF DESCRIPTION OF THE DRAWINGS

FIGS. 1(a) to 1(d) show an example of a mark portion formed on a tread surface according to the present invention.

FIGS. 2(a) and 2(b) show the mark portion shown in FIGS. 1(a) to 1(d)

FIGS. 3(a) to 3(d) show another example of the mark portion formed on the tread surface according to the present invention; FIG. 3(b) being an explanatory plan view of the tread surface when the tread surface is worn by 0%; FIG. 3(c) being an explanatory plan view of the tread surface when the tread surface is worn by 50%.

FIGS. 4(a) and 4(b) show the mark portion shown in FIGS. 3(a) to 3(d)

FIGS. 5(a) to 5(d) show still another example of the mark portion to be formed on the tread surface according to the present invention.

FIGS. 6(a) and 6(b) show the mark portion shown in FIGS. 5(a) to 5(d)

FIGS. 7(a) to 7(d) show still another example of the mark portion to be formed on the tread surface according to the present invention; FIG. 7(b) being an explanatory plan view of the tread surface when the tread surface is worn by 0%; FIG. 7(c) being an explanatory plan view of the tread surface when the tread surface is worn by 50%; and FIG. 7(d) being an explanatory plan view of the tread surface when the tread surface is worn by 80%.

FIGS. 8(a) to 8(d) show still another example of the mark portion to be formed on the tread surface according to the present invention; FIG. 8(b) being an explanatory plan view of the tread surface when the tread surface is worn by 0%; FIG. 8(c) being an explanatory plan view of the tread surface when the tread surface is worn by 50%; and FIG. 8(d) being an explanatory plan view of the tread surface when the tread surface is worn by 80%.

FIGS. 9(a) to 9(d) show still another example of the mark portion to be formed on the tread surface according to the present invention.

FIGS. 10(a) to 10(d) show still another example of the mark portion to be formed on the tread surface according to the present invention.

FIGS. 11(a) to 11(d) show still another example of the mark portion to be formed on the tread surface according to the present invention.

FIGS. 12(a) to 12(d) show still another example of the mark portion to be formed on the tread surface according to the present invention.

FIGS. 13(a) to 13(d) show still another example of the mark portion to be formed on the tread surface according to the present invention.

DETAILED EXPLANATION OF THE PREFERRED EMBODIMENTS

Now, a constitution of the present invention will be described in detail with reference to the accompanying drawings.

Figures 1A, 1B, 1C, 1D:
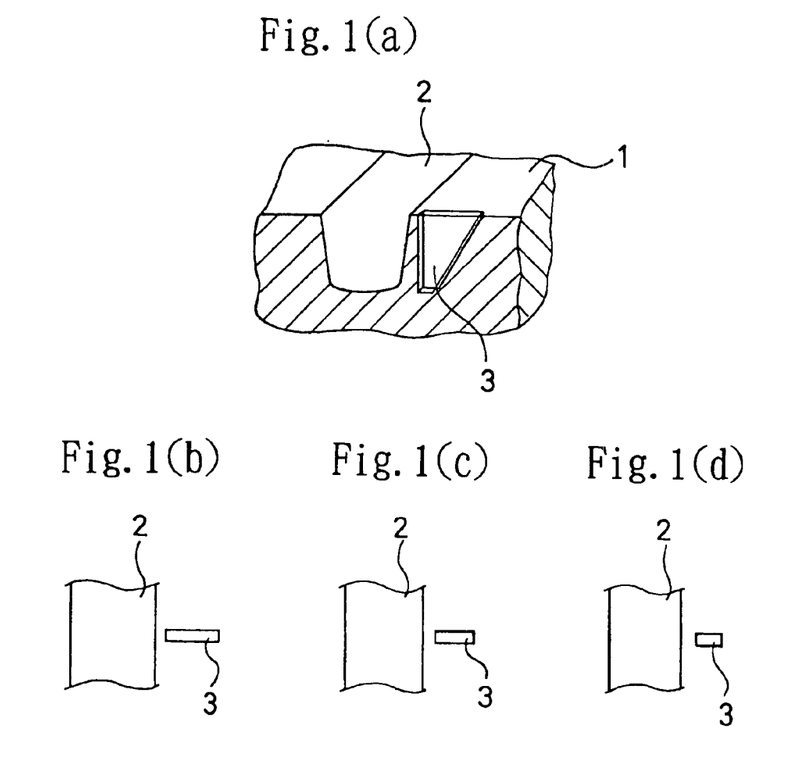
FIG. 1(a) being an explanatory view of a principal portion of a tread sectioned in a meridian direction of a tire.
FIG. 1(b) being an explanatory plan view of the tread surface when the tread surface is worn by 0%.
FIG. 1(c) being an explanatory plan view of the tread surface when the tread surface is worn by 50%.
FIG. 1(d) being an explanatory plan view of the tread surface when the tread surface is worn by 80%.
Figures 2A, 2B:
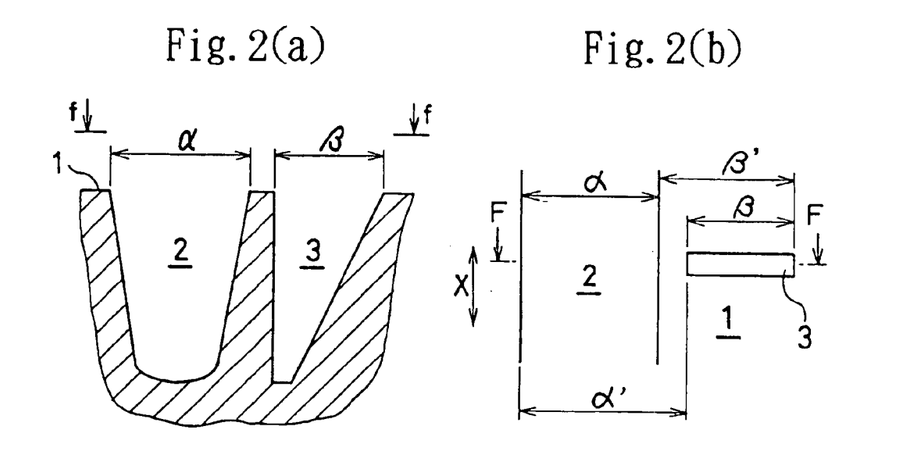
FIG. 2(a) showing a sectional view of FIG. 2(b) taken along a line F—F.
FIG. 2(b) showing a view in the direction of the arrows f in FIG. 2(a).

FIGS. 1(a) to 1(d), and FIGS. 2(a) and 2(b) show a principal portion of a pneumatic tire of the present invention, wherein a thin groove 3 that extends along a width direction of the tire is formed as a mark portion, in the vicinity of a main groove 2 extending on a tread surface 1 along a circumferential direction X of the tire. As shown in FIGS. 1(b) to 1(d), a surface shape of the thin groove 3 gradually changes as the wear progresses from 0%, via 50%, and to 80% (i.e., the surface shape of a rectangle gradually becomes smaller.) And as shown in FIGS. 2(a) and 2(b), a groove width α (i.e., a length in the width direction of the tire) of the main groove 2 becomes narrower toward a bottom of the groove 2. The thin groove 3 has an approximately the same depth as that of the main groove 2, and a length β of the groove 3 in the width direction of the tire becomes shorter from the tread surface 1 toward the inside in the diametral direction of the tire (i.e., toward a bottom of the groove 3).

Figures 3A, 3D:
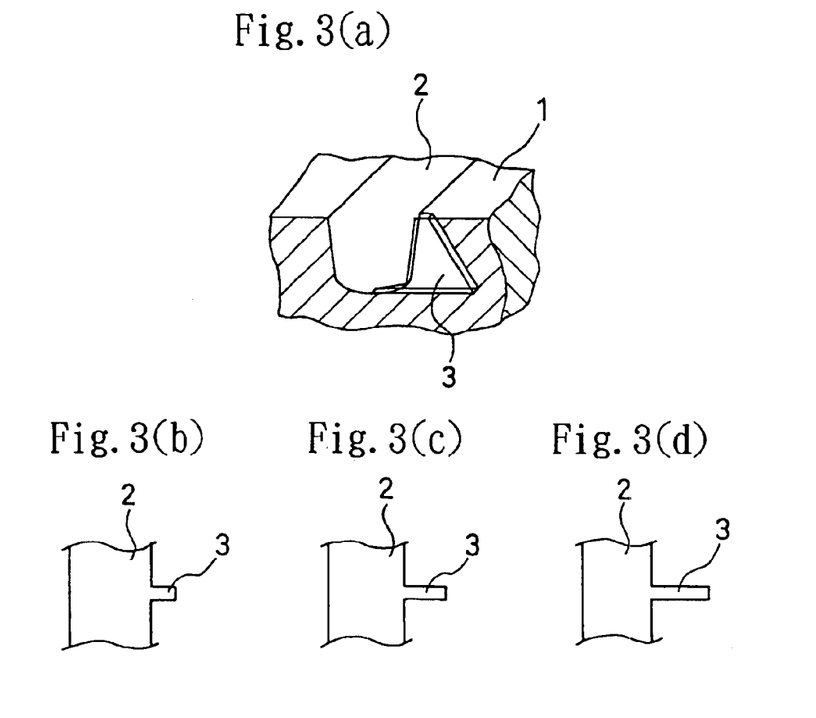
FIG. 3(a) being an explanatory view of a principal portion of a tread sectioned in a meridian direction of a tire.
FIG. 3(d) being an explanatory plan view of the tread surface when the tread surface is worn by 80%.
Figures 4A, 4B:
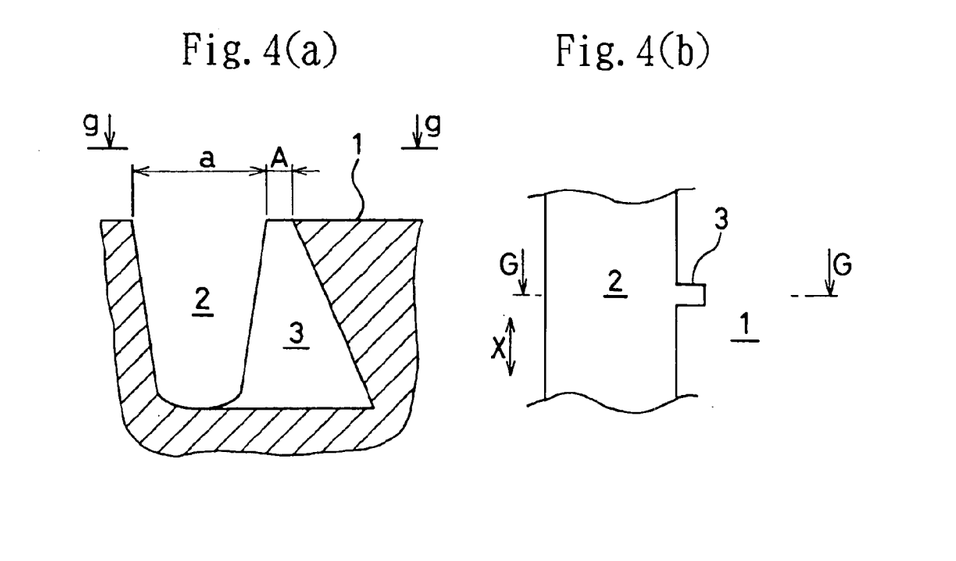
FIG. 4(a) showing a sectional view taken along a line G—G in FIG. 4(b)
FIG. 4(b) showing a view in the direction of the arrows g in FIG. 4(a).

FIGS. 3(a) to 3(d), and FIGS. 4(a) and 4(b) show another example of a pneumatic tire of the present invention, wherein the above-described thin groove 3 is closely placed so as to be in contact with the main groove 2. As shown in FIGS. 3(b) to 3(d), the surface shape of the thin groove 3 gradually changes as the wear progresses from 0%, via 50%, and to 80% (i.e., the rectangular surface shape of the thin groove 3 protruding from the main groove 2 in the width direction of the tire gradually becomes larger). And as shown in FIGS. 4(a) and 4(b), a length A of the thin groove 3 in the width direction of the tire becomes longer toward the inside in the diametral direction of the tire (i.e., toward the bottom of the groove 3).

Figure 5A:
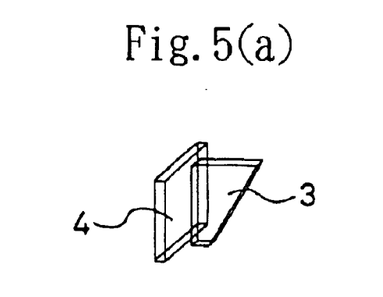
FIG. 5(a) being a stereoscopic explanatory view of the mark portion.
Figure 5B:
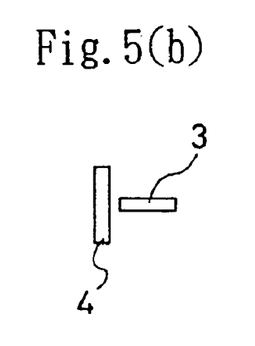
FIG. 5(b) being an explanatory plan view of the tread surface when the tread surface is worn by 0%.
Figure 5C:
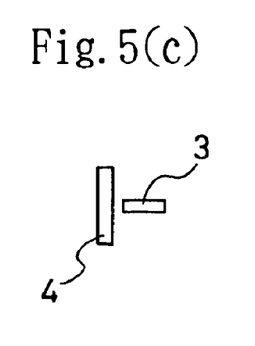
FIG. 5(c) being an explanatory plan view of the tread surface when the tread surface is worn by 50%.
Figure 5D:
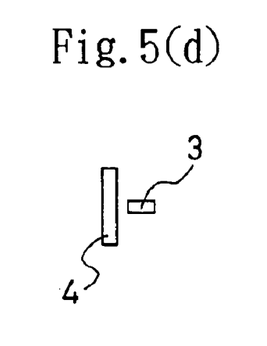
FIG. 5(d) being an explanatory plan view of the tread surface when the tread surface is worn by 80%.
Figure 6A:
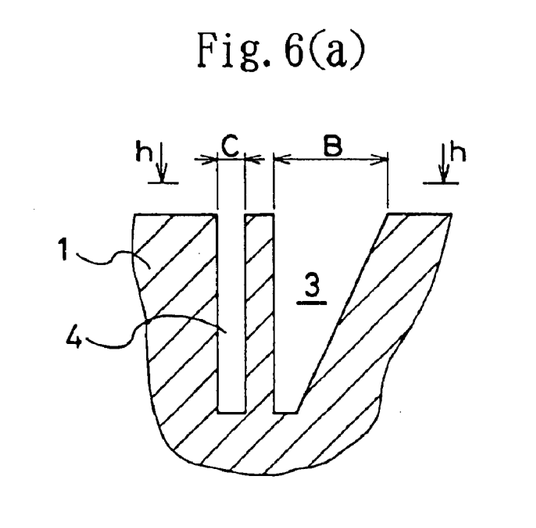
FIG. 6(a) showing a sectional view taken along the line H—H in FIG. 6(b)
Figure 6B:
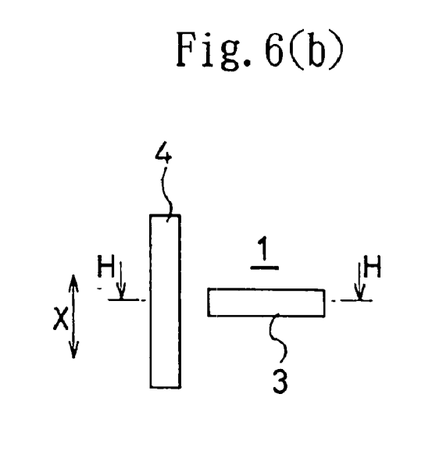
FIG. 6(b) showing a view in the direction of the arrows h in FIG. 6(a).

FIGS. 5(a) to 5(d), and FIGS. 6(a) and 6(b) show still another example of a pneumatic tire of the present invention, wherein a thin groove 3 that extends along the width direction of the tire and another thin groove 4 that extends along the circumferential direction X of the tire are closely placed on the tread surface 1. As shown in FIGS. 5(b) to 5(d), the surface shape of the thin groove 3 gradually changes as the wear progresses from 0%, via 50%, and to 80% (i.e., the surface shape of the rectangle gradually becomes smaller). As shown in FIGS. 6(a) and 6(b), the surface shape of the thin groove 4 does not change due to the wear, while a length B of the thin groove 3 in the width direction of the tire becomes shorter toward the inside in the diametral direction of the tire. The thin groove 4 has the same length C in the width direction of the tire (the groove width) until the bottom thereof and the same depth as that of the thin groove 3. As for the thin groove 3, the length B may be also made gradually longer toward the inside in the diametral direction of the tire, as shown in FIGS. 3(a) to 3(d), and FIGS. 4(a) and 4(b).

Figure 7A:
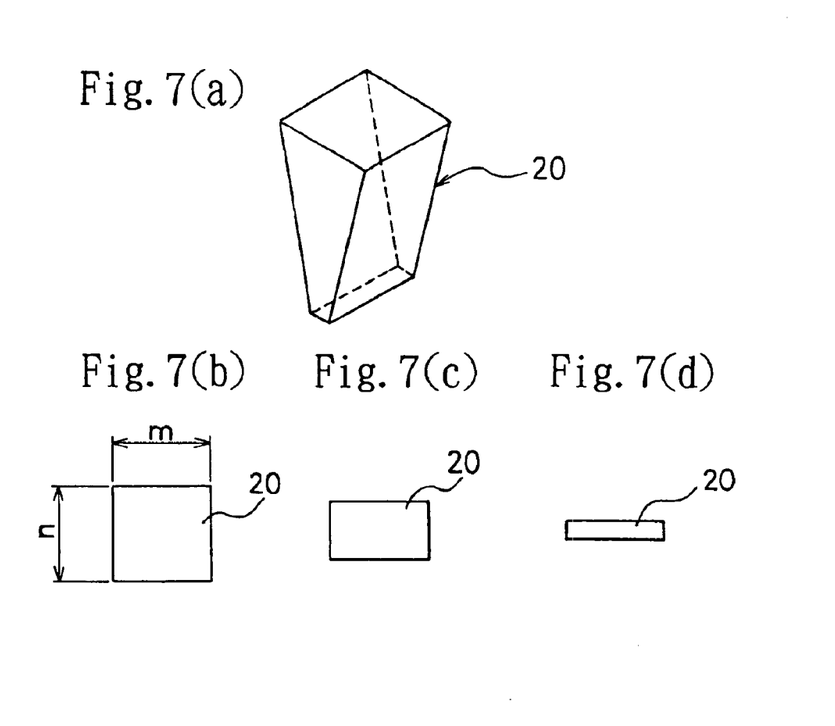
FIG. 7(a) being a stereoscopic explanatory view of the mark portion.

FIGS. 7(a) to 7(d) show a case of the mark portion of a wedged shape. The mark portion 20 of a wedged body in FIG. 7(a) gradually changes its surface shape as shown in FIGS. 7(b) to 7(d), as the wear progresses from 0%, via 50%, and to 80%.

Figure 8A:
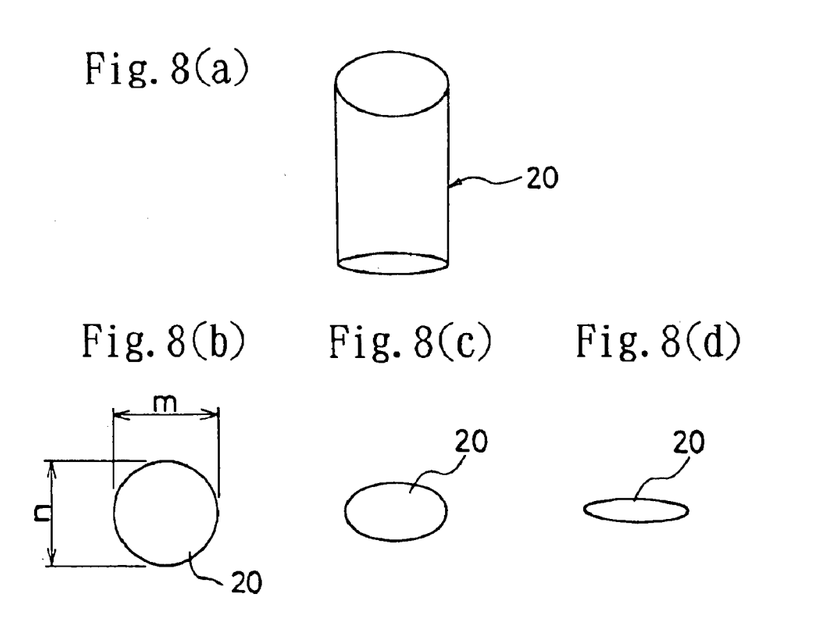
FIG. 8(a) being a stereoscopic explanatory view of the mark portion.
Figures 9A, 9B, 9C, 9D:
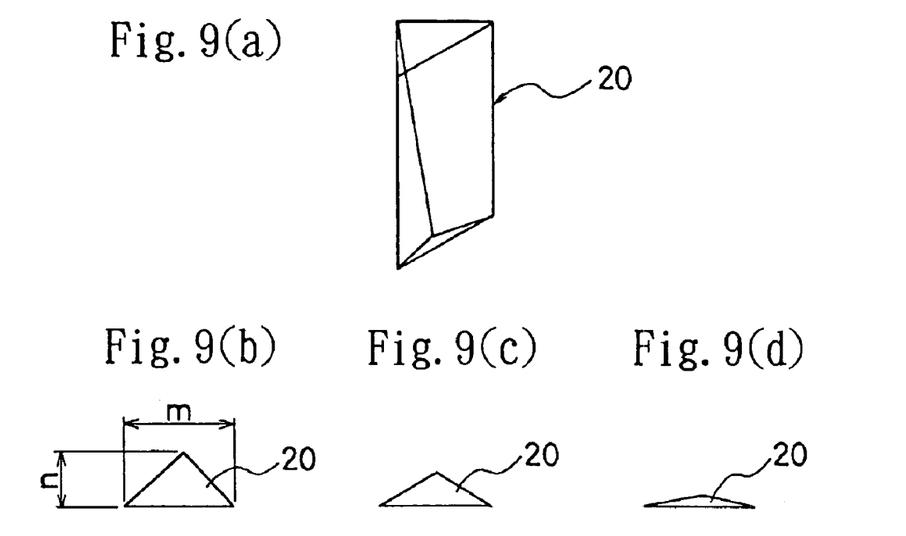
FIG. 9(a) being a stereoscopic explanatory view of the mark portion.
FIG. 9(b) being an explanatory plan view of the tread surface when the tread surface is worn by 0%.
FIG. 9(c) being an explanatory plan view of the tread surface when the tread surface is worn by 50%.
FIG. 9(d) being an explanatory plan view of the tread surface when the tread surface is worn by 80%.

FIGS. 8(a) to 8(d) show a case of the mark portion of a cylinder wherein the mark portion gradually changes its sectional shape from a circle to an ellipse along the longitudinal direction. The mark portion 20 in FIG. 8(a) gradually changes its surface shape from a circle to an ellipse as shown in FIGS. 8(b) to 8(d), as the wear progresses from 0%, via 50%, and to 80%.

FIGS. 9(a) to 9(d) show a case of the mark portion of a triangular prism wherein the mark portion gradually changes an altitude of a triangular section thereof along the longitudinal direction. The mark portion 20 in FIG. 9(a) gradually changes its surface shape as shown in FIGS. 8(b) to 8(d), as the wear progresses from 0%, via 50%, and to 80%.

Figures 10A, 10B, 10C, 10D:
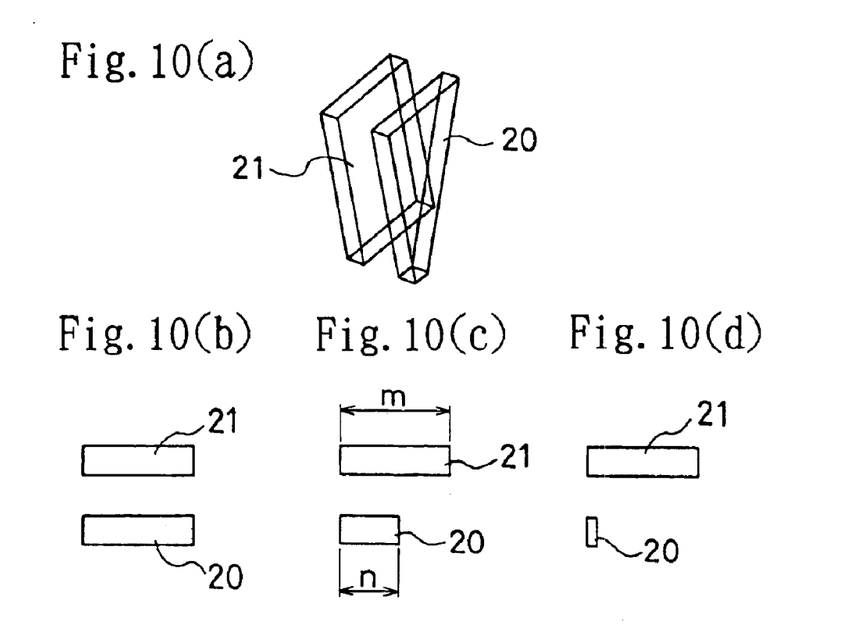
FIG. 10(a) being a stereoscopic explanatory view of the mark portion.
FIG. 10(b) being an explanatory plan view of the tread surface when the tread surface is worn by 0%.
FIG. 10(c) being an explanatory plan view of the tread surface when the tread surface is worn by 50%.
FIG. 10(d) being an explanatory plan view of the tread surface when the tread surface is worn by 80%.

FIGS. 10(a) to 10(d) show a case where the mark portion is a triangular plate shape and accompanied with a rectangular plate body. The mark portion 20 in FIG. 10(a) gradually changes its surface shape (i.e., the length simply changes) as shown in FIGS. 10(b) to 10(d), as the wear progresses from 0%, via 50%, and to 80%, while the surface shape of the rectangular plate body 21 remains unchanged.

Figure 11A:
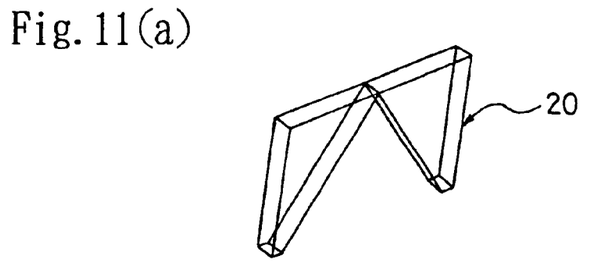
FIG. 11(a) being a stereoscopic explanatory view of the mark portion.
Figure 11B:
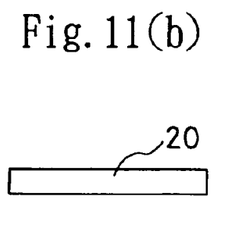
FIG. 11(b) being an explanatory plan view of the tread surface when the tread surface is worn by 0%.
Figure 11C:
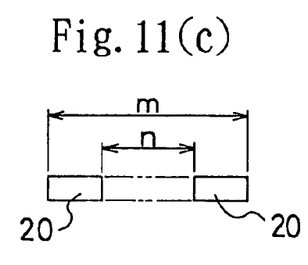
FIG. 11(c) being an explanatory plan view of the tread surface when the tread surface is worn by 50%.
Figure 11D:
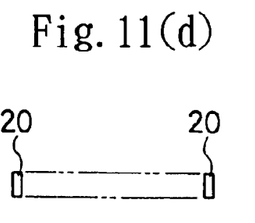
FIG. 11(d) being an explanatory plan view of the tread surface when the tread surface is worn by 80%.

FIGS. 11(a) to 11(d) show a case of the mark portion of a plate with a hollow center portion. The mark portion 20 in FIG. 11(a) gradually changes its surface shape (i.e., a ratio n/m of the gap changes) as shown in FIGS. 11(b) to 11(d), as the wear progresses from 0%, via 50%, and to 80%.

Figure 12A:
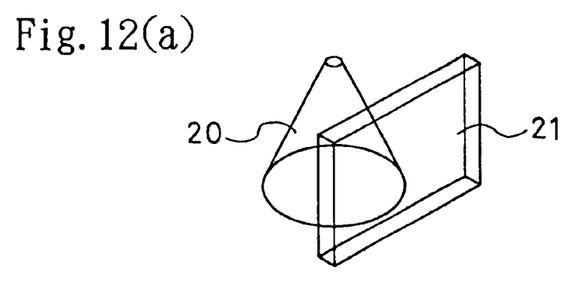
FIG. 12(a) being a stereoscopic explanatory view of the mark portion.
Figure 12B:
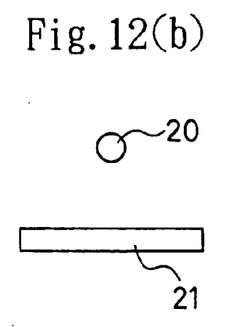
FIG. 12(b) being an explanatory plan view of the tread surface when the tread surface is worn by 0%.
Figure 12C:
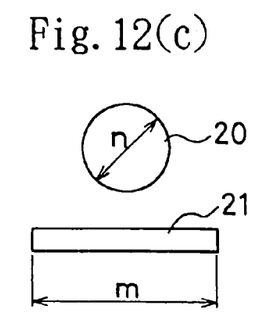
FIG. 12(c) being an explanatory plan view of the tread surface when the tread surface is worn by 50%.
Figure 12D:
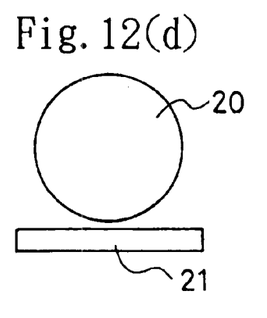
FIG. 12(d) being an explanatory plan view of the tread surface when the tread surface is worn by 80%.

FIGS. 12(a) to 12(d) show a case where the mark portion is of a cone shape and accompanied with a rectangular plate body. The mark portion 20 in FIG. 12(a) gradually changes its surface shape as shown in FIGS. 12(b) to 12(d), as the wear progresses from 0%, via 50%, and to 80%, while the surface shape of the rectangular plate body 21 remains unchanged. Here, the same effect is obtained when the mark portion 20 is of a pyramidal shape.

Figure 13A:
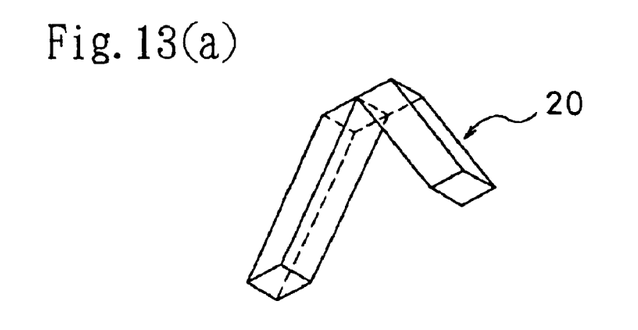
FIG. 13(a) being a stereoscopic explanatory view of the mark portion.
Figure 13B:
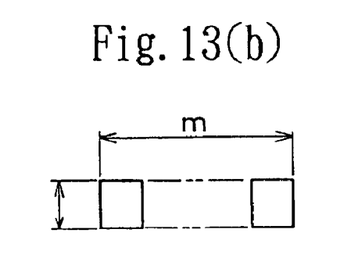
FIG. 13(b) being an explanatory plan view of the tread surface when the tread surface is worn by 0%.
Figure 13C:
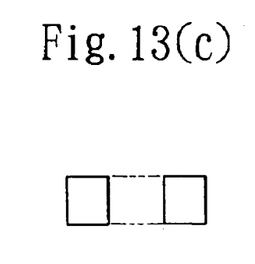
FIG. 13(c) being an explanatory plan view of the tread surface when the tread surface is worn by 50%.
Figure 13D:
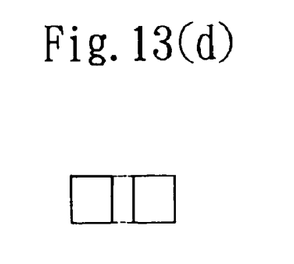
FIG. 13(d) being an explanatory plan view of the tread surface when the tread surface is worn by 80%.

FIGS. 13(a) to 13(d) show a case of the mark portion consisting of two rectangular prisms of different lengths. The mark portion 20 in FIG. 13(a) gradually changes its surface shape (i.e., a ratio of the gap changes) as shown in FIGS. 13(b) to 13(d), as the wear progresses from 0%, via 50%, and to 80%.

Next, a measuring method of a tread wear amount according to the present invention will be described.

Figure 14:
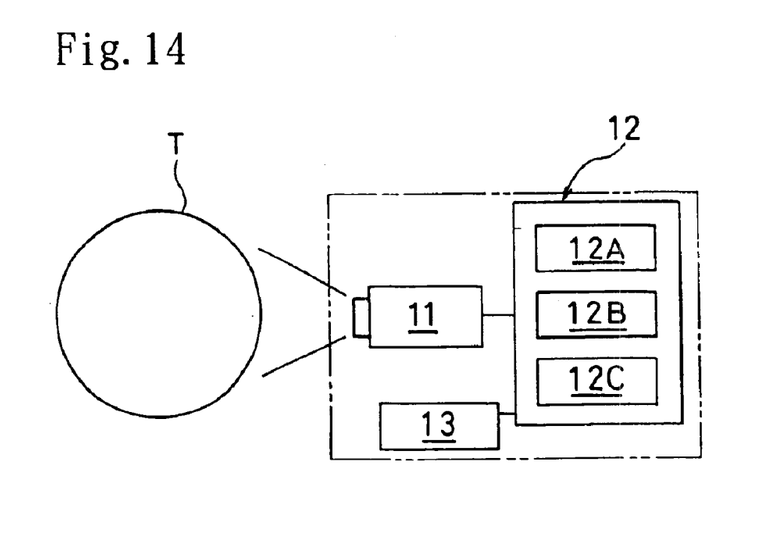
FIG. 14 is an explanatory view showing an example of an apparatus used for a measuring method of a tread wear amount of a pneumatic tire according to the present invention.

FIG. 14 shows an example of an apparatus for measuring the above-mentioned tread wear amount of the pneumatic tire. Here, a reference numeral 11 denotes an optical image detecting means composed of a CCD camera. A reference numeral 12 denotes a processor means for processing the image data inputted from the image detecting means 11. A reference numeral 13 denotes an operating means composed of a keyboard for giving commands and data to the processor means 12 and the like. A reference code T denotes a tire of which the tread wear amount is measured.

The processor means 12 includes a storage unit 12A, a computing unit 12B and a display unit 12C. In the storage unit 12A, inputted in advance are a program for computing the tread wear amount based on the inputted image data, referential data of ratio of a mark portion and data of wear amounts corresponding to the referential data of ratio. The computing unit 12B is adapted to compute the tread wear amount in accordance with the program.

Regarding the referential data of ratio, taking FIGS. 1(a) to 1(d), and FIGS. 2(a) and 2(b) as examples, any one of the ratios of α:β, α:β', α':β and α':β' is adopted (see FIG. 2(b)). For example, the referential data of ratio in the case of the ratio α:β will be as shown in Table 1.

TABLE 1

| wear rate | α | β | α/β |
|---|---|---|---|
| 0 | 12.0 | 11.3 | 1.0 |
| 20 | 10.8 | 9.3 | 1.2 |
| 50 | 9.0 | 6.4 | 1.4 |
| 80 | 7.2 | 3.4 | 2.1 |
| 90 | 6.6 | 2.4 | 2.3 |

As for the referential data of ratio for FIGS. 7(a) to 7(d), the ratios of m:n may be satisfactorily prepared (see FIG. 7(b)). In the cases of FIGS. 8(a) to 8(d), and FIGS. 13(a) to 13(d), similar approaches may be adopted.

The measuring method of a tread wear amount according to the present invention is carried out as described below, by use of the apparatus as described above. In the case of FIGS. 1(a) to 1(d), and FIGS. 2(a) and 2(b), the image detecting means 11 is disposed opposite to the main groove 2 and the thin groove 3 of the tire T, and the image data including the main groove 2 and the thin groove 3 are obtained by the image data detecting means 11. The image data are then inputted to the processor means 12 and stored in the storage unit 12A. The computing unit 12B finds the groove width a of the main groove 2 and the length β of the thin groove 3 out of the image data, and subsequently computes a ratio α/β of those values. The computed ratio data α/β is then compared with the referential data of ratio inputted in advance, therefore a wear amount corresponding to the referential data of ratio that coincides with the ratio data is displayed on the display unit 12C as the tread wear amount of the pneumatic tire T.

In the case of FIGS. 7(a) to 7(d), the image data regarding the m and the n are detected by the image detecting means 11. The image data is then inputted to the processor means 12 and stored in the storage unit 12A. The computing unit 12B finds the respective values of the m and the n, and subsequently computes a ratio n/m of those values. The computed ratio data is then compared with the referential data of ratio inputted in advance, therefore a wear amount corresponding to the referential data of ratio that coincides with the ratio data is displayed on the display unit 12C as the tread wear amount of the pneumatic tire T. The result thus displayed may be also outputted to other instruments, and may be stored in the storage unit 12A. In the above-described case of FIGS. 1(a) to 1(d), and FIGS. 2(a) and 2(b), similar approaches may be adopted.

As another measuring method of a tread wear amount, the following method is applicable, wherein a formula for computing the wear amount is stored in the storage unit 12A in advance instead of using the referential data of ratio (the table) such as Table 1, and the wear amount is obtained by computing at the computing unit 12B. Upon explaining the above-described method whereas taking the case of FIGS. 7(a) to 7(d) as an example, wherein the ratio of m:n when the mark portion 20 is worn by 0% is defined as 10:10=1, and the ratio when it is worn by 100% is defined as 10:2=5, then the wear rate of the tire and the ratio of m:n of the mark portion 20 may be expressed in the following formula:

Wear rate (%)=25χ-25, where χ=(m/n)

The value obtained from this formula will be displayed on the display unit 12C.

In the case of using a formula, the mark portion preferably has a shape in which the value n linearly changes with respect to the tread wear rate (from 0% to 100%) in order to simplify the formula. In the case where the mark portion is made as a shape that does not linearly change, the formula cannot be avoided from a complication such as a polynomial.

Accordingly in the present invention, the mark portion as described above is provided on the tread surface 1 of the pneumatic tire, and is captured by the processor means 12 as image data, then the tread wear amount is measured by use of the ratio as described above. Hence, a complex aligning and moving mechanism as required in a case of measurement with a conventional laser displacement gauge becomes unnecessary. For this reason, a low price, easy maintenance and easy automatic measurement of the tread wear amount are achieved, and the measurement of the tread wear amount can be performed in a short period of time with precision.

In the present invention, the mark portion to be provided on the tread surface 1 may preferably have a different color or a different gloss from a surrounding portion thereof For example, in the case as shown in FIGS. 1(*a*) to 1(*d*), and FIGS. 2(*a*) and 2(*b*), wall surfaces of the thin groove 3 may be colored white so that they are distinct from the surrounding black rubber. Otherwise, a colored member of a different color from the surrounding rubber may be buried in the thin groove 3.

In the case as shown in FIGS. 7(*a*) to 7(*d*), the side of the m part and the side of the n part may be colored differently. In this way, image detection by the optical detecting means 11 can be facilitated further.

What is claimed is:

1. A pneumatic tire comprising, a mark portion provided on a portion of a tread surface of said tire and disposed apart and in isolation from a main groove extending circumferentially about said tire, wherein said mark portion includes a first cavity and a second cavity, each one of the first and second cavities extending into a depth direction of the tread surface, wherein said first cavity has a first surface shape defining a first surface area that continuously changes as a depth of the tread surface decreases due to wear and said second cavity has a second surface shape defining a second surface area that remains constant as the depth of the tread surface decreases due to wear, the isolated first cavity having substantially the same depth as the isolated second cavity and being closely placed on the tread surface next to the isolated second cavity so as to define a wear indicator such that wear amount of the tread surface can be determined using a ratio of image data of the isolated second cavity and image data of the isolated first cavity.

2. The pneumatic tire according to claim 1, wherein wall surfaces of at least one of said first cavity and said second cavity are colored with a different color from that of surrounding rubber.

3. The pneumatic tire according to claim 1, wherein a colored member of a different color from that of surrounding rubber is buried in said at least one of said first cavity and said second cavity.

4. The pneumatic tire according to any one of claims 2 and 3, wherein the first and second surface shapes are in a quadrilateral having a pair of long sides and a pair of short sides respectively, the pair of long sides of the second surface shape is made constant in the depth direction, and the pair of long sides of the first surface shape is made to change in the depth direction from the tread surface.

* * * * *